United States Patent [19]

Isayev

[11] Patent Number: 5,021,475

[45] Date of Patent: * Jun. 4, 1991

[54] COMPOSITE THERMOPLASTIC ELASTOMER BLEND AND PROCESS FOR PREPARING THE SAME

[75] Inventor: Avraam I. Isayev, Akron, Ohio

[73] Assignee: University of Akron, Akron, Ohio

[*] Notice: The portion of the term of this patent subsequent to Mar. 1, 2005 has been disclaimed.

[21] Appl. No.: 283,333

[22] Filed: Dec. 12, 1988

[51] Int. Cl.$^5$ .............................. C08L 1/26; C08J 3/05
[52] U.S. Cl. ........................................ 524/30; 524/42; 524/46
[58] Field of Search .............................. 524/30, 42, 46

[56] References Cited

U.S. PATENT DOCUMENTS

| | | |
|---|---|---|
| 1,723,632 | 8/1929 | Stine et al. . |
| 1,994,328 | 3/1935 | Tefft . |
| 1,999,186 | 4/1935 | Flint . |
| 2,692,245 | 10/1954 | Groves et al. . |
| 3,862,913 | 1/1975 | Sturt . |
| 3,915,909 | 10/1975 | Schnöring et al. . |
| 4,132,685 | 1/1979 | Speyer . |
| 4,143,005 | 3/1979 | Packer . |
| 4,197,371 | 4/1980 | Holst et al. . |
| 4,386,174 | 5/1983 | Cogswell et al. . |
| 4,433,083 | 2/1984 | Cogswell et al. . |
| 4,438,236 | 3/1984 | Cogswell et al. ............... 525/425 |
| 4,728,698 | 3/1988 | Isayev et al. . |
| 4,833,229 | 5/1989 | Magagnini et al. ............... 525/439 |
| 4,843,124 | 6/1989 | Wolfe, Jr. ............... 525/165 |

OTHER PUBLICATIONS

L. A. Goettler et al., *Rubber Chem. Techal.*, vol. 56, p. 619 (1983).
S. R. Moghe, Rubber World, p. 16, (Feb. 1983).
"The Condensed Chemical Dictionary" 10th ed, revised by G. G. Hawley, pub. Van Nostrom Reinhold 1981, pp. 413 & 427.
Kirk-Othmer "Encyclopedia of Chemical Technology" pub. John Wiley & Sons, 3rd ed. 1979, vol. 5, p. 143-163.
S. Suto et al., "A Comparative Study of the Thermoplastic Mesomorphic Tendencies and Rheological Characteristics of Three Cellulose Derivatives: Ethylene and Propylene Oxide Ethers and an Acetate Butyrate Ester;" Rheological Acta, vol. 21, pp. 62, 1982.
L. A. Goettler et al., "Short Fiber Reinforced Elastomers"; Rubber Chemical Technology, vol. 56, p. 621, 1983.

*Primary Examiner*—John Kight, III
*Assistant Examiner*—P. Hampton-Hightower
*Attorney, Agent, or Firm*—Oldham & Oldham Co.

[57] ABSTRACT

Thermoplastic elastomer blends comprising a thermoplastic elastomer and 1–20% by weight of a water insoluble alkyl cellulose exhibit improved mechanical properties compared to the unblended thermoplastic elastomer. The preferred thermoplastic blend of end polypropylene elastomer is EPDM. The preferred concentrations are 2.5–15%, most preferably 5–12%, all percentages being by weight based on total polymer content. The blends are formed by high shear mixing at a temperature at which both materials are melt processible. The alkyl cellulose in the product is present as domains which are essentially uniformly dispersed in a thermoplastic elastomer matrix.

12 Claims, No Drawings

COMPOSITE THERMOPLASTIC ELASTOMER BLEND AND PROCESS FOR PREPARING THE SAME

TECHNICAL FIELD

This invention relates to composite thermoplastic elastomer blends, particularly composite thermoplastic elastomer blends comprising a thermoplastic elastomer, matrix polymer having the second polymer which serves as a reinforcing material dispersed therein.

BACKGROUND ART

Reinforcement of elastomers is usually accomplished by the addition of carbon black or short fibers. Such reinforcement is disclosed, for example in L. A. Goettler, et al., *Rubber Chem. Technol.*, vol. 56, pg. 619 (1983) and in S. R. Moghe, *Rubber World*, pg. 16 (February, 1983). However, it is difficult to achieve uniform dispersion, especially in the case of short fiber reinforcement. In addition, during processing, entanglement or breakage of fibers may occur. In recent years, a series of elastomers reinforced by cellulosic fibers with improved properties has been developed. Their preparation is based on the mixing of melt spun fibers with thermoplastic elastomers.

Liquid crystalline polymers (LCP's) have been mentioned as a possible reinforcement for thermoplastic materials for improvement of their mechanical properties. These so-called self-reinforced composites usually consist of LCP's based on aromatic copolyesters having high melting temperatures. U.S. Pat. No. 4,728,698 to Isayev (the inventor herein) et al. discloses such self-reinforced composites.

DISCLOSURE OF THE INVENTION

It has now been found that self-reinforced polymer blends utilizing a thermoplastic elastomer as the base polymer and a water insoluble lower alkyl cellulose as the reinforcing polymer, can be prepared.

This invention provides novel compositions wherein the composition is composite thermoplastic elastomer blend comprising (a) a thermoplastic elastomer and (b) from about 1% to about 30% by weight of a water insoluble lower alkyl cellulose in which the alkyl radical contains at least two carbon atoms. The amount of said alkyl cellulose is based on the combined amounts of said alkyl cellulose and said thermoplastic elastomer. The alkyl cellulose is insoluble in water (as previously noted) and essentially incompatible with the thermoplastic elastomer and is present in the form of domains which are essentially uniformly dispersed in a matrix of the thermoplastic elastomer. A preferred thermoplastic elastomer is a polymer of one or more monoethylenically unsaturated aliphatic hydrocarbons, optionally a small amount of additional monoethylenically unsaturated monomer or mixture thereof, and a small amount of a diene or mixture thereof.

According to a preferred embodiment of the invention, the thermoplastic elastomer is EPDM (thermoplastic elastomer polymer of ethylene, propylene and a diene), the preferred alkyl cellulose is ethylcellulose, and the amount of ethylcellulose is from about 2.5 to about 15% by weight, based on total polymer weight (i.e., the sum of the amounts of thermoplastic elastomer and ethylcellulose).

This invention according to a further aspect, provides a process for dry blending said thermoplastic elastomer and said alkyl cellulose under high shear conditions at a temperature at which both materials are melt processable.

BEST MODE FOR CARRYING OUT THE INVENTION

The thermoplastic elastomer is preferably a polymer of one or more lower alkenes, i.e. ethylene, propylene, 1-butene, etc., with optionally a small amount of additional monoethylenically unsaturated monomer or mixture thereof (maleic anhydride, for example), said small amount being from zero to not more than about 10% by weight of the thermoplastic elastomer, and a small amount (sufficient for cross linking but not more than about 10% of total monomer weight) of a curative, such as diene or mixture thereof, or sulfur or a peroxide. A particularly preferred thermoplastic elastomer is blended EDPM and polypropylene. According to "The Condensed Chemical Dictionary," 10th Ed., revised by G. G. Hawley, published by Van Nostrand Reinhold Co., 1981, pg. 413, EPDM is a terpolymer elastomer made from ethylene-propylene-diene monomer. The diene is preferably nonconjugated and may be, for example, a cyclic or aliphatic diene such as hexadiene, dicyclophentadiene or ethylidiene norbornene. The unsaturated part of the polymer molecule (e.g. the diene) is pendant from the main chain, which is completely saturated and essentially linear. A suitable thermoplastic elastomer is "Santoprene" (a registered trademark of Monsanto Company of St. Louis, Mo., U.S.A.). Experimental work herein is based on two grades of "Santoprene," i.e., a soft grade 201-64A and a hard grade 203-50D, which differ in relative amounts of EDPM and polypropylene, the hard grade having the greater polypropylene content.

The alkyl cellulose is preferably ethylcellulose and must be water-insoluble. In commercial ethylcellulose, a portion of the hydroxyl groups of cellulose (which is a polymeric material, as is well known) are replaced with ethoxy groups, a portion of ethoxy groups being sufficient so that the polymer is water insoluble. According to "The Condensed Chemical Dictionary" supra, pg. 427, the standard commercial product is a white granular thermoplastic solid, insoluble in water, and having 47-48% ethoxy content, a specific gravity of 1.07-1.18, and a softening point of 100°-130° C. The ethylcellulose used for experiments herein was "Ethocel" (a registered trademark of the Dow Chemical Company, Midland, Mich., U.S.A.).

Ethylcellulose is a long chain polymer as is well known. There exists strong evidence that some cellulosic polymers, including ethylcellulose, are thermotropic LCP's (S. Suto et al., Rheo. Acta, vol. 21, page 62, 1982). The amount of alkyl cellulose is from about one to about 20% by weight, based on total polymer weight, i.e. the combined weights of thermoplastic elastomer and alkyl cellulose. The preferred amount of alkyl cellulose, and particular ethylcellulose, is from about 2.5 to about 15% by weight, most preferably from about 5 to about 12% by weight, based on the combined polymer weight.

The thermoplastic elastomer and the alkyl cellulose must have overlapping melt processing temperatures.

The additional ingredients, such as antioxidants, colorants, etc., may be present, provided that the nature and amount of such ingredients is not such to materially adversely affect the mechanical properties of the blend.

Acceptable additives by and large are granular solid materials. Plasticizers, in particular liquid plasticizers, can also be added.

Other thermoplastic elastomers, such as the thermoplastic polyurethane elastomers can also be reinforced according to this invention, but those described above are preferred.

Mixing of the thermoplastic elastomer and the alkyl cellulose (and other ingredients, when present) is accomplished by means of a high shear mixer. A particularly suitable mixer is the ¾ inch single screw extruder-static mixer apparatus described in the aforesaid U.S. Pat. No. 4,728,698. The mixing temperature is a temperature at which both the thermoplastic elastomer and the alkyl cellulose are melt processable, and is typically about 175° to about 225° C., in particular about 200° C. During the mixing process, the alkyl cellulose becomes essentially uniformly dispersed in the thermoplastic elastomer, which constitutes the matrix polymer. The diameter of these domains is typically quite small, e.g., only a few microns. In the case of hard EPDM, e.g., "Santoprene" 203-50D, a fiber structure is observed, the domains or fibers of ethylcellulose being oriented in the flow direction. This may be observed in a scanning electron microscope (SEM). In soft grade blends, however, the existence of fiber structure is not detected by SEM; however, domains of ethylcellulose dispersed essentially uniformly in a matrix of thermoplastic elastomer are observed. However, reinforcement of the elastomer by the alkyl cellulose is obtained in both cases. The presence of domains of ethylcellulose indicates that the ethylcellulose and the thermoplastic elastomer are incompatible. Indeed, incompatibility of the alkyl cellulose and the thermoplastic elastomer is believed to be necessary for reinforcing action. Further evidence of incompatibility is that the melting point of blends in this invention is not affected by ethylcellulose content and is the same as the melting point of a pure (unblended) thermoplastic elastomer, as shown by differential scanning colorimetry (DSC).

Blends of this invention may be further processed by standard thermoplastics processing techniques, such as injection molding.

Results of mechanical tests indicate that thermoplastic elastomers can be reinforced by blending with an insoluble lower alkyl cellulose, in particular ethylcellulose. Fracture toughness, tear strength and ultimate elongation can be increased by adding ethylcellulose to the thermoplastic elastomer. Ultimate strength and yield stress are not significantly effected by the presence of ethylcellulose at preferred concentrations.

Composites having a fiber structure are anisotropic. For example, ultimate strength is higher and percentage elongation at break is lower in the flow direction than in the transverse direction in such composites.

A composite of 25% by weight ethyloellulose in hard EDPM, i.e., "Santoprene" 203-50D, exhibited significantly higher yield stress than did either uncompounded "Santoprene" 203-50D or samples containing lower loadings of ethylcellulose; however, the overall mechanical properties of composites containing 25% by weight ethylcellulose were not as good as the overall mechanical properties of composites with lower ethylcellulose concentrations. Best overall improvement in mechanical properties was found at ethylcellulose concentrations of about 10% in both soft and hard EPDM. However, some overall improvement is noted at concentrations from 2.5 to about 15% ethylcellulose (this represents all concentrations tested except 25%). Overall mechanical properties of blends containing 25% ethylcellulose were poorer than those of either unblended EPDM or EPDM containing lower concentrations of ethylcellulose; hence, blends containing more than about 20% by weight of ethylcellulose are not recommended and those containing from about 2.5 to about 15% by weight of ethylcellulose are preferred. Most preferred blends are those containing from about 5 to about 12% by weight of ethylcellulose.

Fibrous composites of this invention, e.g., those based on hard EPDM, are readily melt spun. They also exhibit lower viscosities than that of uncompounded hard EPDM. Viscosity at first decreases, then increases with increasing ethylcellulose content. Composites of this invention, especially the fibrous composites are self-reinforced since the domains (particularly the fibers) of alkyl cellulose are formed in situ and reinforce the thermoplastic elastomer.

Polymer composites of this invention in general may be used for the same purposes as other fiber-reinforced polymer composites having the same base polymer.

All percentages of ethylcellulose in elastomer blends throughout this specification (including the claims) are percentages by weight, based on the combined weights of thermoplastic elastomer and ethylcellulose. This combined weight is the same as total composition weight in test compositions, since no additional ingredients were present.

This invention will now be described further with reference to the example which follows:

EXAMPLE

The materials used were thermoplastic elastomers, blend of EPDM and polypropylene, "Santoprene" and ethyl cellulose (EC). "Santoprene" is a fully vulcanized thermoplastic elastomer, a product of Monsanto. The two grades of "Santoprene" used were a soft grade 201-64A and a hard grade 203-50D. The ethyl cellulose used was Ethocel, a product of Dow. The soft or hard grade of "Santoprene" was mixed with EC by means of ¾" single screw extruder-static mixer apparatus. The mixing temperature was 200° C. and the screw speed was 50 rpm. Before the mixing process, "Santoprene" and EC were dried in a vacuum oven at 65° C. and 75° C., respectively, for 24 hours. The prepared blends were tested by various techniques.

Rheological properties of blends were measured by capillary rheometer (Monsanto Processibility Tester) at various temperatures. In addition, the thermal transition temperatures of the blends were measured by DuPont DSC 9900 system under a scanning rate of 10° C./min.

The injection molded tensile bars were prepared by using a BOY 15S reciprocating screw injection molding machine.

Morphological characteristics of the tensile bars broken in liquid nitrogen were observed by Scanning Electron Microscope (SEM). The observations were made along both flow and transverse directions.

Mechanical properties of the injection molded tensile bars were measured by using Monsanto Tensile Tester (T-10) under a speed of 50mm/min with 50 mm gauge length. The tensile set was determined according to ASTM D412-87 at a speed of 50 mm/min and a maximum elongation of 150%. Hardness of the blends was measured by durometer according to ASTM D2240-86. Tear resistance tests were performed according to ASTM D624-86.

Elongation at break of hard grade "Santoprene" blends exceeded 500% (the limit of the tester used) at all EC loadings except 25%. Dynamic mechanical properties of the blends were measured by using Mechanical Energy Resolver (MER) under tension mode at fixed frequency and sweeping temperature.

Results are shown in the table below.

TABLE 1

| Physical Property | Soft EPDM | Hard EPDM |
|---|---|---|
| Modulus (MPA) | | |
| 0% EC | 20 | 600 |
| 2.5% EC | 30 | 700 |
| 5% EC | 40 | 720 |
| 10% EC | 70 | 800 |
| 15% EC | 120 | 900 |
| 25% EC | 220 | 1300 |
| Ultimate Elongation, % | | |
| 0% EC | 200 | — |
| 2.5% EC | 190 | — |
| 5% EC | 240 | — |
| 10% EC | 290 | — |
| 15% EC | 200 | — |
| 25% EC | 10 | — |
| Area under Stress-Strain curve (MPa %) | | |
| 0% EC | 640 | — |
| 2.5% EC | 600 | — |
| 5% EC | 810 | — |
| 10% EC | 1030 | — |
| 15% EC | 600 | — |
| 25% EC | 0 | — |
| Elongation at yield (%) | | |
| 0% EC | — | 33 |
| 2.5% EC | — | 34 |
| 5% EC | — | 32 |
| 10% EC | — | 25 |
| 15% EC | — | 10 |
| 25% EC | — | 5 |
| Hardness | Shore A | Shore D |
| 0% EC | 65 | 53 |
| 2.5% EC | 63 | 53 |
| 5% EC | 65 | 54 |
| 10% EC | 70 | 56 |
| 15% EC | 75 | 59 |
| 25% EC | 89 | 61 |
| Tear Resistance (KN/M) | | |
| 0% EC | 18.2 | 103 |
| 2.5% EC | 18.8 | 99 |
| 5% EC | 19.2 | 98 |
| 10% EC | 17.7 | 91 |
| 15% EC | 15.0 | 87 |
| 25% EC | 14.6 | 80 |

What is claimed is:

1. A composite elastomer blend comprising:
   (a) a thermoplastic elastomer and
   (b) from about 1% to about 20% by weight of a water insoluble thermotropic liquid crystal polymer, based on the combined amounts of said thermotropic liquid crystal polymer and said thermoplastic elastomer, said thermotropic liquid crystal polymer being a water insoluble alkyl cellulose in which the alkyl radical has at least two carbon atoms;
   said liquid crystal polymer being essentially incompatible with said thermoplastic elastomer and being present in the form of domains essentially uniformly dispersed in a matrix of said thermoplastic elastomer.

2. A composite elastomer blend according to claim 1 in which said elastomer is a polymer of one or more monoethylenically unsaturated aliphatic hydrocarbons, optionally a small amount of additional monoethylenically unsaturated monomer or mixture thereof, and a small amount of a diene or mixture thereof.

3. A composite elastomer blend according to claim 1 in which said thermoplastic elastomer is a terpolymer elastomer of ethylene, propylene and a diene.

4. A composite elastomer blend according to claim 1 in which said lower alkyl cellulose is ethylcellulose.

5. A composite elastomer blend according to claim 1 in which the amount of said lower alkyl cellulose is from about 2.5 to about 15% by weight, based on the combined weights of thermoplastic elastomer and alkyl cellulose.

6. A composite elastomer blend according to claim 1 in which the amount of said alkyl cellulose is from about 5 to about 12% by weight, based on the combined weight of said alkyl cellulose and said thermoplastic elastomer.

7. A composite elastomer blend according to claim 1 in which said lower alkyl cellulose is ethylcellulose.

8. A composite elastomer blend according to claim 1 in which said thermoplastic elastomer is a blend of terpolymer elastomer of ethylene, propylene and a diene and polypropylene and said lower alkyl cellulose is ethycellulose.

9. A composite elastomer blend according to claim 8 in which the amount of said ethylcellulose is from about 2.5 to about 15% by weight, based on the combined weights of said thermoplastic elastomer and said ethylcellulose.

10. A composite elastomer blend according to claim 8 which the amount of said ethylcellulose is from about 5% to about 12% by weight, based on the combined weights of said thermoplastic elastomer and said alkyl cellulose.

11. A process for preparing a blend of a thermoplastic elastomer and from about 1 to about 20% by weight of a water insoluble thermotropic liquid crystal polymer, based on the combined weights of said thermoplastic elastomer and said liquid crystal polymer, said liquid crystal polymer being a water insoluble alkyl cellulose in which the alkyl radical has at least 2 carbon atoms, which comprises mixing said thermoplastic elastomer with said liquid crystal polymer, subjecting the resulting mixture to high shear conditions under melt processing conditions at a temperature at which both materials are melt processible, and recovering a blend in which said liquid crystal polymer is present in the form of domains essentially uniformly dispersed in a matrix of said thermoplastic elastomer.

12. A process according to claim 11 in which said thermoplastic elastomer is a blend of ethylene-propylene-diene terpolymer and polypropylene and said alkyl cellulose is ethylcellulose.

* * * * *